Reissued June 23, 1942

Re. 22,124

UNITED STATES PATENT OFFICE 22,124

UREA RESINS AND ACID TREATMENT THEREOF

Carleton Ellis, Montclair, N. J., assignor to Ellis-Foster Company, a corporation of New Jersey No Drawing. Original No. 2,075,804, dated April 6, 1937, Serial No. 689,165, January 28, 1924. Application for reissue October 30, 1940, Serial No. 363,584

12 Claims. (Cl. 260—6)

This invention relates to certain synthetic products of use in the arts made from urea by reaction with other materials as will be hereinafter described and relates particularly to products which may be cast, molded, machined or otherwise treated to make shaped articles and also to varnishes, lacquers, paints and enamels containing such synthetic products. It is especially an object of the invention to obtain light colored or white articles or material which are not readily discolored by light or heat.

This invention is concerned with the reaction products of urea or equivalent substance with formaldehyde or equivalent substance and an acid body or in some cases an alkaline or basic substance followed by an acid body.

This application is a continuation in part of my copending applications Serial Nos. 590,672, 591,262 and 568,251.

As set forth in Serial 590,672 urea reacts with formaldehyde as has been shown by Goldschmidt, Berichte, 1896, 2438; Chem. Ztg. 1897, 46, 460 and 586; Holzer, Berichte 1884, 17, 659; 18, 3302; Tollens, Berichte 1896, 2751; Einhorn and Hamburger, Berichte 1908, 41, 24, and Dixon, Trans Chem. Soc. 1918, 113, 238, and others.

The preparation of for example a casting mix may be carried out as follows. Urea, preferably alcohol refined to give a pure white product, is dissolved in aqueous formaldehyde solution; the ordinary formalin containing 37 to 40 per cent of $CH_2O$ preferably being employed. To 20 parts by weight of urea 54 parts of the formalin solution may be used.

The urea and formaldehyde are caused to react by the addition of a catalyst e. g. an alkaline substance may be used as a primary catalyst. For this purpose caustic alkali may be used and in the proportion of .4 part dissolved in an equal weight of water. As reaction takes place the mixture heats and eventually becomes turbid. Preferably the reaction is checked at the first appearance of turbidity by the addition of a mild acid or other suitable neutralizing agent. Acetic acid may be used. The neutral solution will keep for an indefinite time and is thus a substantially stable body. The setting of this solution for casting and molding is brought about by the addition of an acid, preferably a strong acid such as hydrochloric or phosphoric, oxalic and the like. Acid salts such as sodium bisulphate or aluminum chloride also may be used. Glycerine, casein, gelatine, Irish moss, algin and other modifying or tempering agents may be added. The reaction mixture may be colored or tinted any shade and the white form may be suitably colored in delicate shades or to represent ivory etc. The foregoing white product resembles porcelain in outward appearance when freshly cast and may be used for receptacles, handles, knobs, ornaments, paper weights, and a multiplicity of other purposes.

The addition of a few drops of hydrochloric acid to a considerable bulk of the neutral solution suffices to start the reaction forming the final or ultimate substance which causes the whole liquid to thicken and form a homogeneous coagulum which gradually hardens until of surprising hardness. The product appears perfectly homogeneous in spite of the large amount of water in the formalin. The proportion of urea and formalin may be varied. The amount of final acid catalyst to use varies with the strength of the acid. The mixture heats on addition of the final catalyst and setting may be retarded to some extent by cooling. Enough catalyst should be present to cause a good degree of setting but not so rapidly as to preclude the addition of fillers, when desired, and the pouring of the mixture into molds of plaster of Paris, glass, copper or other materials. Any filler not neutralizing the acid may be used. Plaster of Paris and china clay, silex, ground quartz, titanium oxide and the like may be used for white or porcelain-like articles. Any suitable pigment or dye may be added. Organic fillers such as flock or wood flour may be used. Asbestos also may be incorporated.

When white articles are not desired the urea may not be as good a quality, and the formaldehyde may be a brown commercial grade. Alkalies tend to turn the color of the urea-formaldehyde reaction product over to a brown. Strong alkali in excess may prevent solidification entirely. An acid substance as the final catalyst is best when a snow-white product is required. An acid catalyst may be used throughout in some cases.

The amount of filler added varies with its bulk and usually should not exceed the weight of the organic binder formed by the reaction. Without a filler a high gloss or finish is usually obtained.

The casting may be allowed to stand in the mold a sufficient length of time to become hard enough to handle. This may take from a few minutes to a half hour or longer. The article is then removed and may be exposed to the air freely for a time to allow superficial drying and elimination of formaldehyde odor. This exposure may take place at room temperature or a somewhat elevated temperature. If the water is expelled from the product it becomes transparent and glassy and very hard.

Fillers may be impregnated with the aforesaid neutral solution (urea and formaldehyde reacted with an alkali to incipient turbidity, then neutralized) and dried to form a molding powder especially to make white molded articles.

A good method of procedure in judging the degree of reaction between urea and the formaldehyde, paraform or other aldehyde employed is to permit the reaction between the two substances, as for example urea and paraform, to progress in the alkaline medium to the point where particles begin to precipitate and at that instant arrest the action by the addition of acetic or other acid to approximate neutrality. If the alkali is allowed to react beyond a certain point the whole mass may solidify to a magma or white pasty substance which cannot be used advantageously for casting although it may be dried out and used in certain hot-pressing operations. Therefore before the liquid starts to thicken with separation of the reaction product the liquid is neutralized. Thereafter the acid catalyst (e. g., a strong acid such as hydrochloric, sulphuric, phosphoric or oxalic acid, or milder acid substances such as sodium bisulphate and certain organic acids) may be added in such proportion, with or without cooling, as may be desired with reference to speed of setting.

As set forth in application Serial 568,251 methylol urea may be used alone or in conjunction with various natural or synthetic resins or resin-forming substances, with or without fillers or extending and coloring agents.

Either the monomethylol urea or the dimethylol urea may be used singly or in admixture or their appropriate derivatives may be utilized, e. g., substituted ureas acting in a similar or equivalent manner. The term urea is employed here to embrace carbamide and appropriate derivatives.

Thus dimethylol urea or mixtures of this substance with some monomethylol urea are preferred, or in other words I prefer in this case to use a body produced from urea and formaldehyde containing not substantially less than one nor more than two mols of formaldehyde for each mol of urea. When dimethylol urea is heated it melts somewhere in the neighborhood of 120° C. but on further heating for example 20 or 30 degrees higher reaction takes place and a substance is formed which is quite infusible at the temperature at which it is produced and may be heated to a considerably higher temperature before softening or carbonization occurs. For example it may be heated nearly 100 degrees above its hardening point before it begins to show signs of decomposition. This property of heat-setting or becoming thermo-rigid makes possible the use of the material in or as a basis of molding compounds which under heat and pressure become solidified or consolidated to a shaped mass. Molded articles may be obtained which are firm, strong and more or less heat resistant.

In the molding field there is desired not necessarily a perfectly infusible resin or binder but one which on solidifying at the molding temperature is sufficiently firm at that temperature to be removed from the molding press while still hot and be handled and exposed without deformation or loss of surface lustre. The labor cost in molding is so great that the few minutes time required to cool the mold in the production of plastics from fusible resins which do not harden or become thermo-rigid represents a considerable item in the total cost of manufacture. Hence the desirability of a resin not necessarily infusible but which will sufficiently harden in the mold at the molding temperature.

Dimethylol urea is suitable for this purpose on account of its hardening property, the differential or spread in temperature between the melting point and the point at which it decomposes under strong heating is sufficiently great that even though not wholly infusible it is capable of meeting the demand for a labor-saving molding compound of this general character.

It is not necessary to employ pure dimethylol urea but the crude substance, contaminated with various other bodies, may be used in many cases. It is however desirable to heat the crude dimethylol urea for a period to thoroughly dry it and remove as far as possible any substances which might evolve gases in the mold. Thus dimethylol urea was baked 18 hours at 120° C. A white product was obtained which was placed in a mold in powdered form and molded at 300° F. under a pressure of 1000 pounds and higher. A white solid article was obtained which had a glossy surface and which when placed in a Bunsen flame did not melt but burned slowly with carbonization.

Desirable combinations may be made with various synthetic resins as for example by incorporation with a fusible phenol formaldehyde resin. Such a mixture on heating in the mold yields a heat-resisting urea compound. A product of this character will set sufficiently in hot pressing to be useful in molding operations. The reaction is a complex one, the urea compound probably forming the substance $C_5H_{10}N_4O_3$ in part and also probably reacting with the phenol formaldehyde product to a certain extent. In place of phenol, cresol, naphthol and other reactive bodies are not excluded. Acetaldehyde also may be used with, or in some cases in substitution for, formaldehyde.

Another type of molding composition is made from a binder comprising dimethylol urea and a resin obtained by reacting with furfural on phenol. For example furfural is mixed with several times its volume of phenol or cresol, an excess of the phenolic body being used and this is treated with a small amount of hydrochloric acid. The latter may be aqueous hydrochloric acid or preferably alcohol saturated with the gas. Hydrochloric acid reacts on furfural very violently and the tendency is to form a black rubber-like substance which is insoluble and infusible and without any useful properties in that condition. When only a small amount of phenol is present such as would be required solely for the reaction with furfural the tendency also is to produce the infusible rubbery substance. An excess of phenol however which may be removed at the close of the reaction by steam distillation or in any other suitable manner permits of the formation of a fusible furfural resin which is then capable of being incorporated with fillers or extending agents. The amount of hydrochloric acid used need not be large preferably when kept down to a few per cent there is less danger of forming an infusible product. The reaction may be allowed to take place advantageously at about 80° C. A fusible resin having been obtained in this manner may be incorporated with dimethylol urea in various proportions. Thus a major proportion of the furfural resin may be used in some cases while in others it is desirable to use an excess of the dimethylol urea. As the plastic substance obtained is darkened by the furfural resin the composition is best adapted for use in making brown or black molding compounds.

Still another composition is that made by reacting on furfural with aniline hydrochloride. For example 1 part of aniline hydrochloride is dissolved in 2½ parts of furfural and is very gently heated and incorporated with dimethylol urea. Although dimethylol urea itself is commercially stable when stored or shipped, the product resulting from the reaction of aniline hydrochloride and furfural is strongly acid, and when this product is incorporated with dimethylol urea care should be taken to avoid any increase of the temperature which forms an infusible compound prematurely.

Still another composition is that involving a mixture of dimethylol urea and monomethylol urea incorporated in various proportions as for example equal parts by weight. While this material may be used by itself for molding purposes it may also be admixed with the fusible phenol formaldehyde resin for example as above described or with a furfural phenol resin or a furfural aniline resin. The proportions used being for example equal parts or compositions containing more of one constituent than the other.

Dimethylol urea also may be incorporated with phenol sulphur resins made by reacting on phenol with sulphur chloride. For example 1 part by weight of phenol is treated with 2 to 2¼ parts of sulphur monochloride to yield a resin as described in my prior application pending.

This resin may be incorporated with 10 per cent and upwards of dimethylol urea.

Dimethylol urea may be incorporated with natural resins such as shellac and copal resin. Thus cracked Congo resin as "run" by heat treatment in the manufacture of varnishes may be utilized. Also bodies of the nature of asphaltum or gilsonite may be used.

Various fillers or extending agents as indicated may be employed for example mineral fillers, gypsum, whiting, mica, infusorial earth, clay and asbestos or organic fillers such as cotton flock, wood pulp, sawdust, wood flour, cork, leather scrap, etc.

Molding compounds may be made by mixing such fillers as for example equal parts of filler and binder to form molding powders. The filler may be simply ground with the binder or may be impregnated by means of a solution. Or the materials may be incorporated and worked out into sheeted form. This may be accomplished by mixing on differential rolls and then running through sheeting rolls.

Paper or cloth may be impregnated and sheets pressed together to form blocks. The binding agent in the form of a solution may be used as a lacquer or incorporated with filler may be employed as a cement.

Shaped articles made under heat and pressure in accordance with the foregoing may be defined or characterized by containing a heat-set urea derivative.

In the foregoing I have mentioned the use of dibasic acids such as oxalic acid in carrying out the reaction. The employment of other acids such as lactic, succinic, tartaric, citric, malic and other acids in the aliphatic series, and benzoic, salicylic, acetyl salicylic, phthalic acid and the like in the aromatic series and their corresponding anhydrides is feasible.

When urea, phthalic anhydride and aqueous formaldehyde are mixed and heated in an open flask a milky liquid at first appears but on continued heating, preferably by boiling, the solution gradually clarifies and a thin transparent syrup is formed which on cooling becomes heavy bodied. Fifteen minutes to one hour boiling usually suffices to bring about this conversion. The heavy bodied syrup thus obtained will on long standing sometimes, for example in a few days time, show some separation of a whitish solid substance.

The syrup obtained in this way has the curious property of being soluble in or miscible with organic solvents such as methyl or ethyl alcohol or with a ketone such as acetone. This solubility or miscibility has certain limits as too great an addition of for example acetone will give a white precipitate. Also if diluted with water a white precipitate will form in some cases when a certain dilution is reached.

For ordinary purposes the syrup may be diluted with an equal volume of acetone. This provides a solution which may be used as a varnish or impregnating medium. A coating of this material slowly hardens on exposure to air and much quicker on baking. Thus the solution may be applied to metal surfaces and the articles baked in order to produce a hard transparent coating.

When urea and formaldehyde are caused to react without an acid as for example by simply heating together a product is obtained which is very quickly discolored at high temperatures. The same is true when urea and formaldehyde are caused to react in the presence of a base, such as an alkali or hexamethylenetetramine. Such products seem to be rather sensitive to heat at temperatures above 100° C. and tend to turn yellow or brown. In attempting to mold such products discoloration is likely to occur. With the phthalic product a marked resistance to discoloration by heating is noted. This is important in making white articles which retain their color on baking or molding in a hot press.

(A) A preferred mixture is made by boiling together 15 parts of urea, 15 parts of phthalic anhydride and 60 parts of ordinary aqueous formaldehyde of 37 to 40 per cent strength. The mixture may be boiled in an open flask for 12 to 15 minutes or longer if necessary to bring about clarification. The use of a reflux condenser is not always desirable because it may tend to cause the syrup to deposit a heavier precipitate of white material on standing. However suitable arrangements may be made such as an ordinary condenser (not refluxing) to collect any distillate and recover formaldehyde. In some cases the heating may be carried out in an autoclave under pressures above atmospheric.

(B) Another mixture is made by heating 50 parts each of urea and phthalic anhydride and 150 parts of aqueous formaldehyde. This product is not as readily miscible with acetone.

(C) Another product was obtained by heating 10 parts of urea, 20 parts of phthalic anhydride and 60 parts of aqueous formaldehyde. This product is somewhat more miscible with acetone than in the case of (B) and has slightly better keeping qualities.

(D) 20 parts of urea, 10 parts of phthalic anhydride and 60 parts of aqueous formaldehyde were mixed and boiled with the object of producing a clear solution but only a milky syrup could be obtained. This product was less readily incorporated with acetone.

(E) 20 parts urea, 50 parts phthalic anhydride and 50 parts aqueous formaldehyde were boiled together. When hot a pasty white product resulted which thickened somewhat on cooling.

A thick layer of syrup (A) was dried at 50° C. until the material could be removed from the drying pan and cut into various shapes such as strips, cubes and the like. These articles when air dried for 3 or 4 weeks were found to be clear and glass-like. On the other hand the product is very sensitive to higher temperatures when in the initial syrupy or soluble form and may be very quickly transformed into an infusible product by heating to 110–130° C. without discoloration. This enables various molding compositions and molded articles to be obtained as will be subsequently described.

Aqueous solutions generally tend to thicken and set to a solid pasty mass in the course of time. When thinned with acetone however the solutions show a much greater permanency which is desirable for many applications.

Acetone will mix in the cold with a syrup such as is obtained according to Example A. Alcohol however does not mix as well and it is better to add this solvent to the freshly prepared warm syrup.

The phthalic-urea complex made in this way when not baked or exposed to any high degree of heat is soluble in furfural. It is also soluble in phenol. The latter will dissolve even the baked material in many cases. A solution of the well dried resinous complex may be dissolved in furfural and a solution of nitrocellulose and acetone admixed with it to give a clear product.

Various tests were made with the syrupy material such as described in Example A as a binder for the customary fillers employed in the plastic molding art with the object of producing molded articles which were heat resistant. Thus 50 parts by weight of syrup A were mixed with 100 parts of asbestos fibre and dried in a vacuum to 90° C., then ground and pressed for 10 minutes in a hydraulic press at 110° C. An infusible heat-resistant molded article was obtained having a good glossy surface, slightly gray in color due to the asbestos employed.

In another case equal parts of syrup A and wood flour were well mixed and dried up to 50° C. in a vacuum dryer until the moisture was removed and then ground. Finally it was air-dried for 4 hours. On pressing in a hydraulic press at 110° C. for 10 minutes, pressure of 3000 pounds, a light yellow translucent hard tough molded article was obtained.

No mold lubricant was required, the molded article leaving the hot mold freely without sticking. A temperature of 110° C. is a relatively low one for molding purposes and was used in the present case in order to give as favorable results as possible in regard to light color. The temperature of molding may however be increased with consequent increase in speed of setting or curing in the mold to produce an infusible article which may be taken from the mold without necessity of cooling.

In addition to phthalic anhydride or phthalic acid other organic acids both monobasic, dibasic and polybasic may be used, including acids of both aliphatic and aromatic series, such as the following: Benzoic acid, citric acid, acetic anhydride, propionic acid, gallic acid, lactic acid, maleic acid, salicylic acid, tartaric acid, acetyl salicyclic acid, oxalic acid, mucic acid, tannic acid, trichloracetic acid, and stearic acid.

When one part by weight of urea and four parts by weight of 40% aqueous formaldehyde were boiled for 5 minutes together with one part by weight of acetyl salicyclic acid, a very thick syrup formed which could be changed to a transparent jelly. This reacted very quickly on a hot plate to produce a clear, transparent resin. The rate of hardening or curing is notably rapid.

Among the uses for the product of the present invention is in the varnish, lacquer, paint and enamel industry, as an impregnating material, for hat stiffening and as a cement. It may be reinforced by the use of appropriate wire netting or by sheets of paper or cloth. Or articles may be built up of impregnated sheets of fibrous material pressed together in a hot press.

"Non-breakable" glass may be formed by cementing two panes of glass together by the urea-phthalic derivative. Careful baking to avoid bubbles serves to harden the cementing agent.

The material of the present invention may be mixed with other substances such as resins, nitrocellulose, or other cellulose esters or ethers, with shellac solutions, either aqueous or alkaline, and the like.

By the term "acid agent of resinification" as used in the claims is meant an acid in the presence of which, urea and formaldehyde or their derivatives yield resins.

What I claim is:

1. A heat and pressure shaped article containing the reaction products of urea, an acid and formaldehyde.

2. The herein described process of making artificial bodies, which consists in heating formic aldehyde and carbamid together with organic bodies of acid character having more than one carbon atom.

3. A heat set acid-resinified urea, obtained from a substantially stable body comprising an intermediate compound of urea and formaldehyde which body contains not substantially less than one nor more than 2 mols of formaldehyde for each mol of urea, by heat-hardening in the presence of a compound which has an acid reaction under the hardening conditions.

4. A resinous acidified reaction product of urea and formaldehyde obtained by bringing together a substantially stable intermediate compound of urea and formaldehyde, and an acid-reacting compound.

5. A complex containing a resinified formaldehyde-urea reaction product and a tempering agent.

6. A complex containing a resinified formaldehyde-urea reaction product and casein.

7. A thermo-plastic urea-formaldehyde condensation product containing an agent, the acidity of which is increased by heating.

8. A process for the manufacture of condensation products from urea and formaldehyde, wherein the condensation is conducted under a more than atmospheric pressure.

9. A process for the manufacture of condensation products from urea and formaldehyde in one stage of which at least the condensation is carried out in the presence of an acid, wherein the condensation is conducted under a more than atmospheric pressure.

10. The process of producing products of urea-formaldehyde resins, comprising the steps of obtaining a substantially fusible, hardenable intermediate reaction product of urea and formaldehyde, and treating such intermediate reaction product with an agent, the acidity of which is increased by heating, to produce a hardened resin.

11. An acid-resinified aldehyde urea soluble in normally liquid lower monohydric aliphatic alcohols, such aldehyde urea being an acid-resinified urea-formaldehyde reaction product in the form of a solution in such an alcohol.

12. A product as specified in claim 11 in which the urea and formaldehyde are resinified in the presence of an acid resinifying agent to form a syrup, and then the freshly prepared syrup is dissolved in the alcohol.

CARLETON ELLIS.